(12) United States Patent
Goodwin et al.

(10) Patent No.: US 8,898,741 B2
(45) Date of Patent: Nov. 25, 2014

(54) PORTAL BRAND MANAGEMENT

(75) Inventors: Greg Goodwin, Provo, UT (US); Carl B. Andersen, Orem, UT (US)

(73) Assignee: Novell, Inc., Provo, UT (US)

( * ) Notice: Subject to any disclaimer, the term of this patent is extended or adjusted under 35 U.S.C. 154(b) by 381 days.

(21) Appl. No.: 13/165,139

(22) Filed: Jun. 21, 2011

(65) Prior Publication Data

US 2012/0331525 A1 Dec. 27, 2012

(51) Int. Cl.
- *G06F 21/22* (2006.01)
- *G06F 3/0481* (2013.01)
- *G06F 21/44* (2013.01)

(52) U.S. Cl.
CPC .............. *G06F 3/0481* (2013.01); *G06F 21/44* (2013.01)
USPC ............................ 726/4; 726/2; 726/3; 726/5

(58) Field of Classification Search
USPC .................... 726/4, 2, 3, 5; 715/765
See application file for complete search history.

(56) References Cited

U.S. PATENT DOCUMENTS

| | | | |
|---|---|---|---|
| 5,909,220 A * | 6/1999 | Sandow | 345/589 |
| 7,890,877 B2 | 2/2011 | Ritchy et al. | |
| 2003/0229853 A1 | 12/2003 | Norgren et al. | |
| 2005/0083355 A1 * | 4/2005 | Tezuka et al. | 345/694 |
| 2005/0166159 A1 * | 7/2005 | Mondry et al. | 715/769 |
| 2005/0278297 A1 | 12/2005 | Nelson | |
| 2006/0044324 A1 * | 3/2006 | Shum et al. | 345/595 |
| 2007/0089053 A1 * | 4/2007 | Uhlig et al. | 715/513 |
| 2008/0240595 A1 * | 10/2008 | Le Hanne | 382/243 |

* cited by examiner

*Primary Examiner* — Kambiz Zand
*Assistant Examiner* — Ayoub Alata
(74) *Attorney, Agent, or Firm* — Schwegman Lundberg & Woessner, P.A.

(57) ABSTRACT

Apparatus, systems, and methods may operate to receive, from a node associated with a console owner, an authenticated access request for access to a network portal. Additional activities may include accessing a branding file associated with the console owner, and responsive to the receiving, generating a branded version of a graphical user interface having one or more background colors, a display structure, and a set of uncolored icons. The background color(s) and the icons may be selected based on information stored in the branding file. The branded version may be published to grant access to the network portal, displaying the uncolored icons in front of the background color(s) so that the background color(s) are visible through transparent portions of the uncolored icons. Additional apparatus, systems, and methods are disclosed.

17 Claims, 5 Drawing Sheets

(2 of 5 Drawing Sheet(s) Filed in Color)

PORTAL BRAND MANAGEMENT

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example code and/or pseudo-code described below, and in any drawings appended hereto: Copyright 2011 Novell, Inc. of Waltham, Mass.—All Rights Reserved.

BACKGROUND

When managing access to a network portal, perhaps as part of operating within a cloud computing architecture, service providers sometimes have the unenviable problem of supplying a consistent look and feel across a multitude of hosted or cloud-based services and/or applications. The problem may be compounded when multi-tenant access is provided. In this case, each tenant may expect to be presented with a console that is specifically branded to their enterprise. Providing such an environment can be costly and time-consuming, inhibiting the rapid deployment and adoption of hosted services over a range of settings.

SUMMARY

In various embodiments, apparatus, systems, and methods that facilitate portal brand management are provided. For example, in some embodiments, portal brand management is implemented by publishing a non-branded version of a graphical user interface to a display to grant access to a network portal. Additional activities include: receiving, from a node associated with a console owner and the display, a customizing request to customize the non-branded version of the graphical user interface; receiving, from the node, a selection of at least one color included in a branding color scheme to be associated with a set of permanently unchangeable, uncolored icons; storing, in a branding file, components comprising the selected color(s) as a background color; and publishing a branded version of the graphical user interface to the display to grant access to the network portal, where the branded version is generated by applying the stored components to the non-branded version.

In some embodiments, once the branding file is created and stored, access to the branded portal is made available. Thus, portal brand management may include receiving, from a node associated with a console owner, an authenticated access request for access to a network portal hosted by a server. Additional activities may include: accessing the branding file associated with the console owner, and responsive to receiving the network portal access request, generating a branded version of a graphical user interface having one or more background colors, a display structure, and a set of uncolored icons. The background color(s) and the icons may be selected based on information stored in the branding file. Additional activity may include publishing the branded version to the node to grant access to the network portal, the branded version displaying the uncolored icons in front of the background color(s), visible through transparent portions of the uncolored icons. Additional embodiments are described, and along with the foregoing examples, will be set forth in detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Service providers that manage the operation of network portals often deploy a library of bitmaps, cascading style sheet (CSS) definitions, hypertext markup language (HTML) pages, etc. that serve as tools to construct portals having a consistent look and feel across hosted and cloud-based offerings. For example, a tenant may want its access portal to be displayed using specific colors in the background, with its corporate logo, background bitmaps, and other branding collateral to be used as the underlying theme, to provide a branded management and access console.

Embodiments of the invention provide a mechanism to allow the rapid customization of management and access consoles so that each tenant can easily select the look and feel of their own console, which can be changed at will. This can be accomplished without bitmap editing, uploading icon libraries, operating within a development environment, or even publishing a color scheme.

In some embodiments, this occurs when mechanisms are provided that automatically configure an existing generic display structure and icons to reflect the tenant's corporate colors, bitmaps, and other branding collateral. Some embodiments also operate to evaluate tenant branding collateral, to select complementary colors for tabs, the frame background, and other display elements, producing an appearance which is pleasing to the eye.

Figure 1:
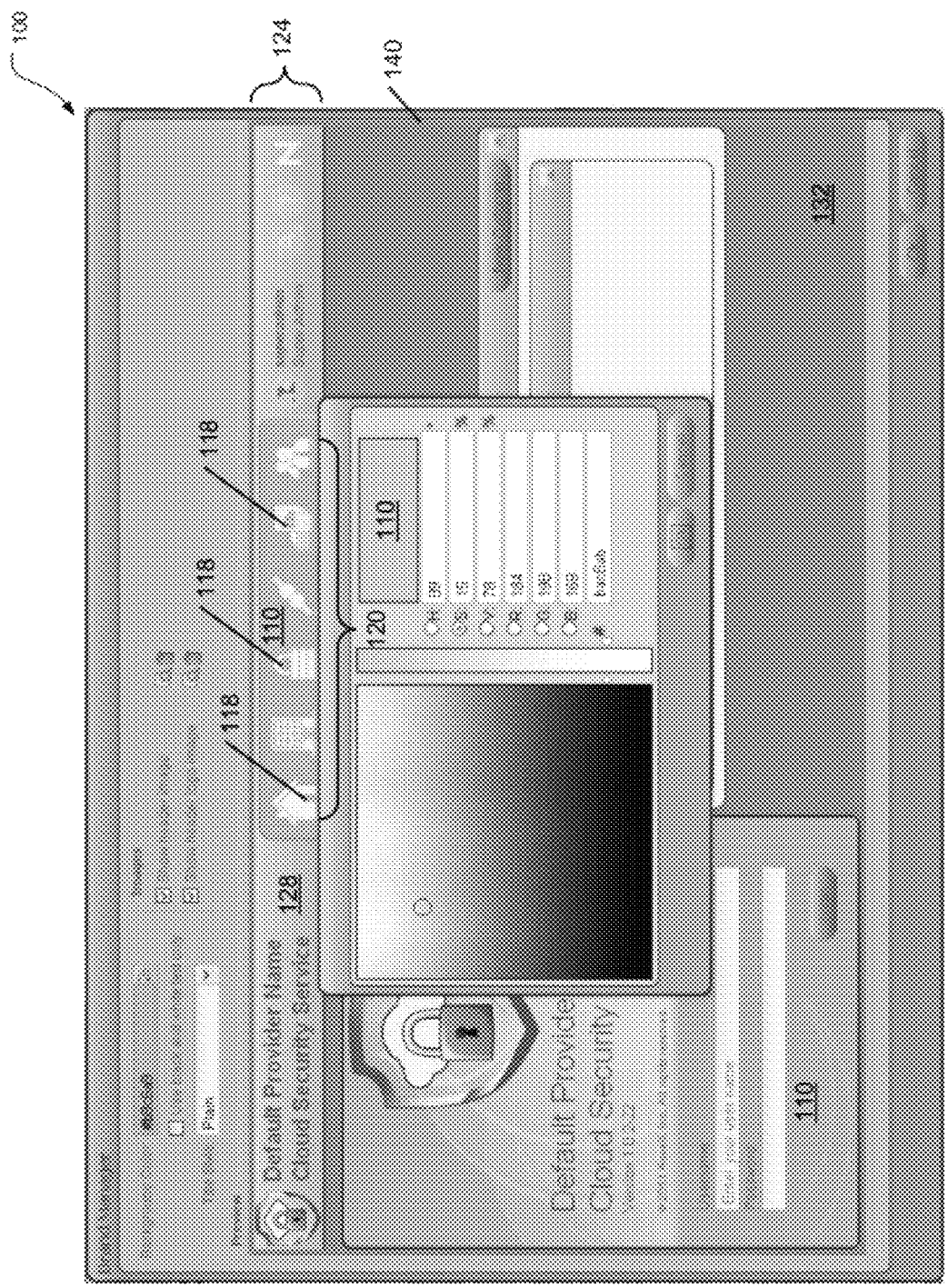
FIG. 1 illustrates the creation of a branded version of a graphical user interface according to various embodiments of the invention.

FIG. 1 illustrates the creation of a branded version of a graphical user interface (GUI) 100 according to various embodiments of the invention. Here a specific background color 110 (e.g., having hue, saturation, and value selected as numerical values of 89, 15, and 78, respectively) has been selected and applied to the GUI 100. The icons 120 are transparent, so that when they are displayed in front of the background color 110 (e.g., the primary color in a tenant's branding collateral color scheme), the background color 110 can be seen through the transparent portions 118 of the icons 120. The background layer or portions thereof (e.g. the top strip 124 with major access tabs) can be a different color 128 than the color 132 used in the remainder of the background 140. The color 128 may be automatically chosen to be a complementary color to color 110, perhaps according to a color wheel—or perhaps as the secondary color of a tenant's corporate branding collateral color scheme, wherein the primary (e.g., dominant) color in the scheme is taken as the background color 110.

In some embodiments, multiple levels of look and feel can be implemented. These levels may include background, structure, and icons. In some cases, there is only a single instance of an icon layer, a structure layer, and a background layer. In others, each layer includes multiple instances that combine to produce a cohesive whole. Thus, for example, several layers of a display structure can be utilized to provide appropriate definition for a variety of display elements, including hierarchical tabs.

Due to the manner in which various embodiments operate, the owner of the console (e.g., a management or access console) is free to develop a console with a common set of icons and an underlying display structure (e.g., tabs along the top, tabs along the side, navigational aids, etc.), along with logic that permits the console to perform desired functions. This development can be accomplished without affecting the background color, and or other branding artifacts applied to the console via the branding file.

Figure 5:
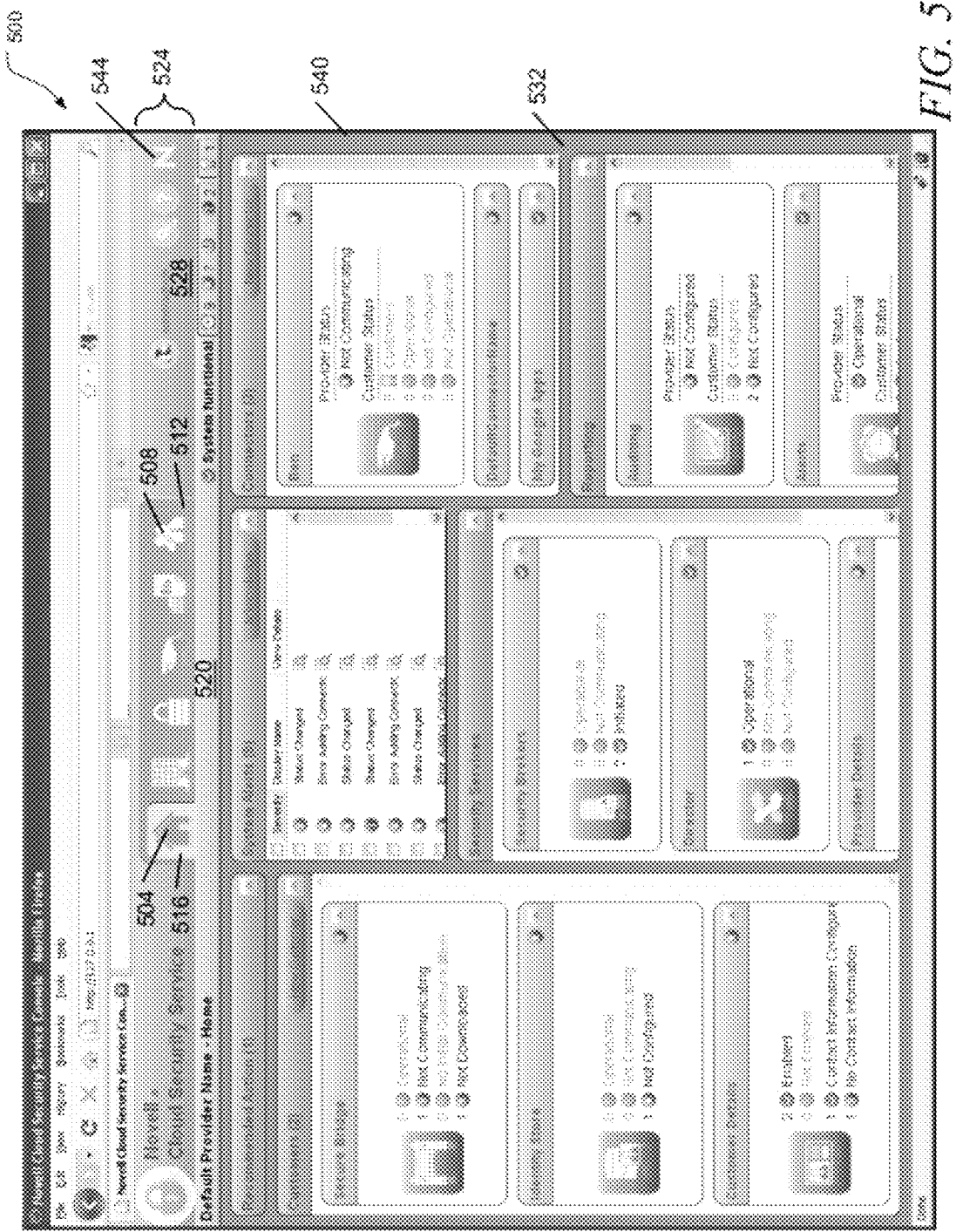
FIG. 5 is an example of a branded version of a graphical user interface that provides access to a console according to various embodiments of the invention.

For example, FIG. 5 is an example of a branded version of a GUI 500 that provides access to a console according to various embodiments of the invention. In this case, a single background color, along with gradient, mirroring, inversion, and other appearance elements are applied without regard to the background layer.

Here it can be seen that icons for selected (e.g., icon 504) and non-selected (e.g., icon 508) console states may be distinguished by reversing the transparent portion of the iconic image. That is, a non-selected icon 508 may be displayed in front of a background color 512, with the background color clearly visible though the transparent portions of the non-selected icon 508. The selected icon 504 may be displayed in front of a background color as well, with its normally transparent portions reversed to be opaque, and the opaque portions reversed to be transparent. The selected icon 504 may be further distinguished using a button border color 516 surrounding the selected icon 504 that has a different color from the border color (background) 512 surrounding the non-selected icon 508. A selected icon 504 may be displayed to match the top of a gradient bar 520 displayed below the selected icon 504 so that the surrounding button border color 516 flows smoothly into the region of the gradient bar 520.

In some embodiments, the background layer of the GUI 500, or portions thereof (e.g. the top strip 524 with major access tabs), can be a different color 528 than the color 532 or bitmap used for the remainder of the background 540. Thus, in lieu of or in conjunction with colors, one or more bitmaps may be selected for storage in the branding file, along with other components associated with the branding collateral.

Colors and/or bitmaps may be computationally selected when the tenant accesses the console. By authenticating to the provider's portal, the coloring and bitmap specifications of the tenant are accessed in the branding file and applied to a generic console, without any prior modification to the console. Thus, branding file components are simply applied to a generic version of the GUI representing the console—there is no need to redeploy bitmaps or anything related to the customized color scheme. There is also no need to alter icons or the display structure (tabs, inversions, etc.) to brand each console, or a portion thereof, specifically to a tenant and/or service or application. In many cases, this type of operation increases deployment efficiency while providing a high degree of customization for each tenant.

In some embodiments, the color scheme, bitmaps, and other branding collateral are evaluated procedurally at access time so that appropriate color juxtaposition and presentation is provided by analyzing the stored color scheme and complementing it with secondary colors, tertiary colors, warm colors, cool colors, tints, shades, tones, color harmonics (e.g. complementary, analogous, triadic, split complementary, rectangle, square, etc.) so that a desired outcome can be affected, including a desired psychological effect.

In some embodiments, each page or section of a console presentation within a GUI 500 can be configured to transmit information to the viewer, and receive information from the viewer, while presenting the desired branding information associated with the enterprise to which access has been granted.

The gradients used in some embodiments of the invention can be graded from white to grey/black, or from high-transparency to low-transparency (where high-transparency has a higher degree of transparency than low-transparency). Detail and mirroring can be accomplished with a combination of gradient transparency and white/grey/black colors. Non-selected icons 508 can also be made to appear disabled by simply changing the background color displayed behind the icon, so that the same version of an icon can be displayed, whether it has been selected or not—only the background color changes.

In some embodiments, the first time a tenant logs into their portal, a set of default colors/icons are applied to provide a generic GUI presentation of the console. If the tenant presents the proper credentials, permission is granted to change colors/icons to brand the portal as desired for future access. Subsequent access by the tenant and others will display the GUI console using the selected colors/icons, as determined by accessing the stored branding file.

Some of the icons may be replaced using branding collateral (e.g., an icon is replaced with a device 544, such as a trademark owned by a corporate tenant). Some icons are static: they can't be replaced, and their appearance is affected only by the color of the background over which they are displayed. These static icons have one or more transparent portions, and may have a gradient, without color. The static icons can be displayed on top of the background color that matches branding collateral supplied by the tenant, such as the dominant color in a corporate trademark. Some icons are opaque (and do not permit color to bleed through).

For the purposes of this document, "branding collateral" comprises at least one color and a trademark. The color(s) may be selected manually or automatically, perhaps corresponding to one or more colors in a trademark owned by a company. The branding collateral may also comprise a set of icons, at least some of which are transparent (i.e., have transparent portions which permit a background color to bleed through).

The set of colors and icons can be selected manually, or automatically. Selections can be presented using lists (e.g., menus), grids, color wheels, and in other ways. Different colors can be selected for different elements of the GUI (e.g., the background of a dialog box, title bar background, primary buttons/tabs, secondary button/tabs, primary panels, subpanels, text, etc.). Complementary colors may be automatically determined by using mathematical calculations on a color wheel, as is known to those of ordinary skill in the art. Gradients are part of icons created by a graphic designer and gradients are usually not changed by branding.

When a trademark is used to generate the color selection, the dominant color in the trademark (i.e., the color that occupies the largest number of pixels in an image of the trademark) may be selected as the primary background color in some embodiments. Secondary background colors can also be selected as other colors taken from the trademark that are not the dominant color.

To translate the branding collateral into GUI modifications, elements are stored in the associated branding file. The branding file is thus created, stored, and recalled so that the stored collateral elements can be applied to the generic console when subsequent access to the portal is requested. The branding file may comprise one or more Cascading Style Sheets (CSSs). If a tenant accesses the portal prior to creation of the branding file, a default portal is supplied, with a generic console (which console may present an option of branding the portal).

The display structure may be determined at design time and does not change with branding. The display structure determines which portions of the GUI are associated with colors, icons, and gradients. The display structure operates to filter the specification supplied by the console owner, to generate the GUI giving access to the portal. Thus, many embodiments may be realized.

Figure 2:
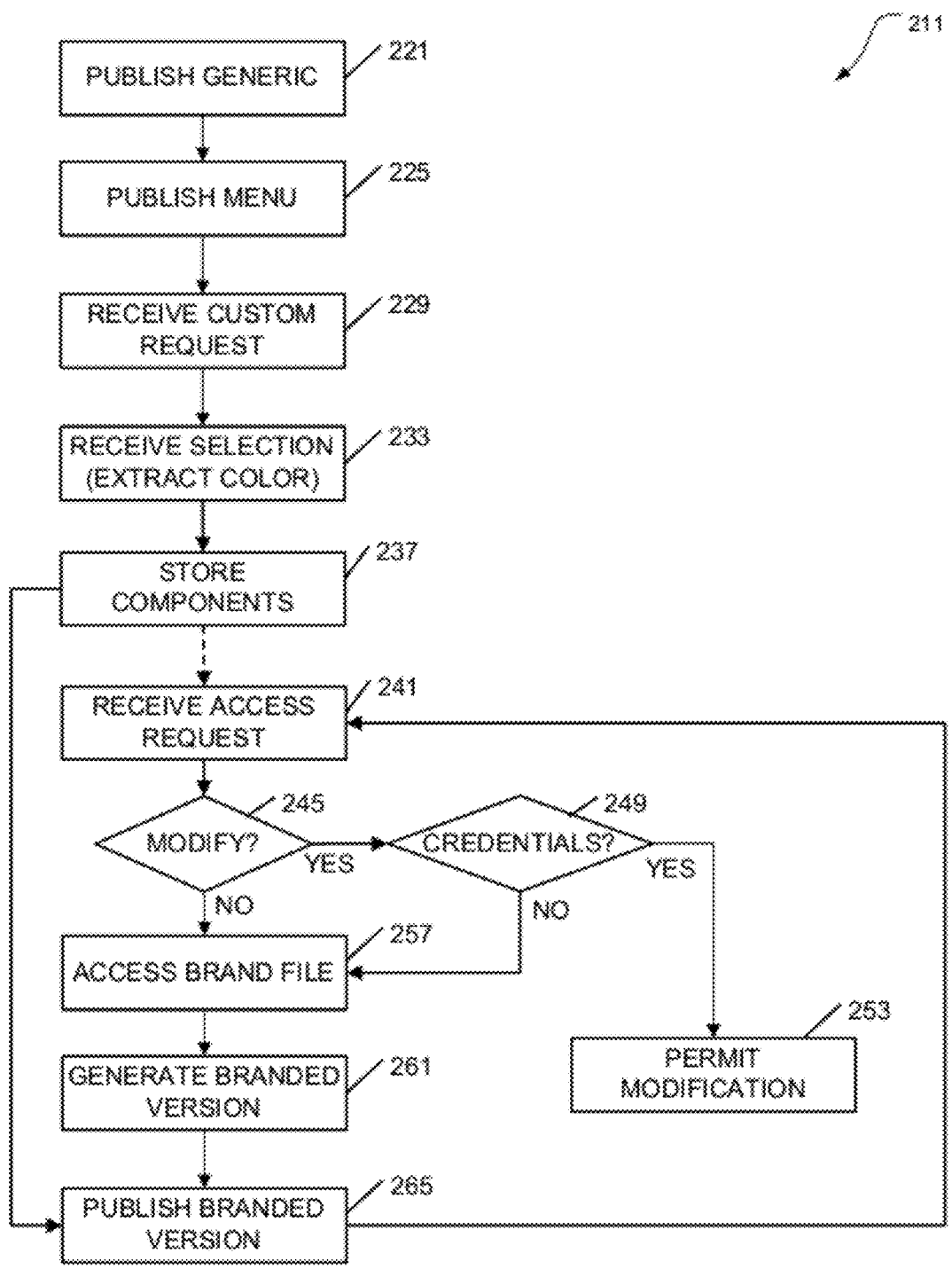
FIG. 2 is a flow diagram illustrating methods of implementing portal brand management according to various embodiments of the invention.

For example, FIG. 2 is a flow diagram illustrating methods 211 of implementing portal brand management according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2, including managing the transition from accessing a generic portal to accessing a branded portal.

Thus, in some embodiments, a processor-implemented method 211 that can be executed on one or more processors that perform the method may begin at block 221 with publishing a non-branded version of a GUI to a display to grant access to a network portal.

A menu selection of color assignments for GUI elements may be presented on the display. Thus, the method 211 may comprise, at block 225, publishing a menu to the display to present options with respect to the application of color to display elements in the branded version of the GUI.

The method 211 may continue on to block 229 to include receiving, from a node associated with a console owner and the display, a customizing request to customize the non-branded version of the GUI.

The method 211 may thus include, at block 233, receiving, from the node, a selection of at least one color included in a branding color scheme to be associated with a set of permanently unchangeable, uncolored icons.

Branding collateral may be automatically analyzed to determine a scheme of colors. Thus, the activity at block 233 may comprise extracting one or more background colors, including primary and secondary colors in the branding file color scheme, from an image comprising a trademark associated with the console owner.

The chosen color(s) may include a background color, which can be selected using hue, saturation, value/lightness and/or RGB (red, green, blue additive color model) values. Thus, the activity at block 233 may comprise receiving the selection as at least one of a hue and saturation selection, or a primary color selection.

The method 211 may continue on to block 237 to include storing, in a branding file, components comprising one or more colors (including a bitmap) as a background color. The display structure may also be stored in the branding file in some embodiments. In some cases, the branding file comprises one or more CSSs.

In some embodiments, the method 211 may continue from block 237 on to block 265 with publishing a branded version of the GUI to the display to grant access to the network portal, where the branded version is generated by applying components (stored in the branding file) to the non-branded version of the GUI.

In some embodiments, authenticated access to the portal is requested, after which the branding file is accessed to generate a branded version of the GUI, which is then published to enable access to the portal, perhaps using the node associated with the access request.

For the purposes of this document, "uncolored" means an object is rendered as black and white, or in gray-scale. A "transparent portion" of an object refers to a portion of the display area located within the outer boundary of the object that permits the display of a background color when the object is placed in front of the background color (e.g., the background color can bleed through the transparent portions of the object). Authentication can operate to determine which branding file is used to control branding for a particular user.

Thus, in some embodiments, the method 211 may continue from block 237 on to block 241 with receiving, from a node associated with a console owner, an authenticated access request for access to a network portal, perhaps hosted by a server.

Even though access to the portal is permitted, in some embodiments, only those having proper credentials are allowed to modify the branded version of the GUI. Thus, the method 211 may include, at block 245, monitoring the network portal to detect a modification request to modify the branded version of the GUI.

If it is determined that proper credentials have been received (perhaps by storing them in the branding file to match with credentials presented by a user accessing the portal) at block 249, the method 211 may continue on to block 253 with permitting modification of the branded version of the GUI—perhaps by allowing access to the branding file and/or saving modifications that are made to the file.

If it is determined that the modification request is not associated with correct modification credentials at block 249, the method 211 may continue on to block 257 after denying the modification request.

The method 211 may thus include, at block 257, accessing a branding file associated with the console owner (the association being made prior to receiving the authenticated access request), responsive to receiving the access request.

The method 211 may continue on to block 261 with generating a branded version of a GUI having at least one background color, a display structure, and a set of uncolored icons, the background color(s) and the icons being selected based on information stored in the branding file.

The console owner is associated with "branding collateral" that, for the purposes of this document, includes at least a trademark, and a color scheme. One or more colors in the trademark may be included in the color scheme. In some embodiments, the trademark is uncolored. Thus, the background color(s) may form part of a set of colors included in branding collateral associated with the console owner.

Colors that complement the background color can be selected automatically. Thus, the activity at block 261 may comprise selecting at least one complementary color to apply to the branded version of the GUI based on the background color(s) and an electronic color wheel or an electronic color palette, among others.

The method 211 may continue on to block 265 to include publishing the branded version of the GUI to the requesting node to grant access to the network portal. The branded version of the GUI may be used to display the uncolored icons in front of the background color(s), so that the background color(s) is/are visible through transparent portions of the uncolored icons.

In some embodiments, there are two kinds of icons published as part of the branded GUI: a preselected group of non-changeable, uncolored icons with transparent portions, and one or more changeable icons that may or may not have transparent portions. The GUI and icons are displayed in accordance with the brand collateral color scheme when published on the background color, and are used to automatically recreate the portal upon receipt of a request for access.

Changeable icons may be displayed along with the non-changeable, uncolored icons. Thus, the activity at block 265 may comprise publishing a changeable, colored icon comprising a trademark associated with the console owner as part of the branded version, with or without unchangeable, uncolored icons. The unchangeable, uncolored icons may include a fixed gradient that is shared among all such displayed icons. Thus, the unchangeable, uncolored icons may comprise a common, fixed gradient.

The activity at block 265 may also comprise publishing the uncolored icons as permanently unchangeable icons, and publishing at least one icon having no transparent portions that comprises a changeable icon including a trademark associated with the console owner.

A particular version of the branded console may be selected from several versions associated with the same branding file, according to the identity provided by the node initiating a request for access to the portal. For example, the identity may operate to identify the user requesting access as a member of a group associated with the branding file (e.g., a member of the shipping and receiving team, or a member of human resources, etc.). Thus, the activity at block 265 may comprise publishing the branded version as one of a set of versions associated with the branding file, the branded version selected from the set according to an identification of the console owner as a particular member of a group associated with the branding file.

The display elements can include a background, buttons, etc. Thus, the activity at block 265 may comprise publishing display elements in the branded version of the GUI to a display, the display elements comprising at least one of a display background, a button, a title bar, or a dialog box. Additional embodiments may be realized.

The methods described herein do not have to be executed in the order described, or in any particular order. Moreover, various activities described with respect to the methods identified herein can be executed in repetitive, serial, or parallel fashion. The individual activities of the methods shown in FIG. 2 can also be combined with each other and/or substituted, one for another, in various ways. Information, including parameters, commands, operands, and other data, can be sent and received in the form of one or more carrier waves.

The methods of portal brand management shown in FIG. 2 can be implemented in various devices, as well as in a computer-readable storage medium, where the methods are executed by one or more processors. Further details of such embodiments will now be described.

Figure 3:
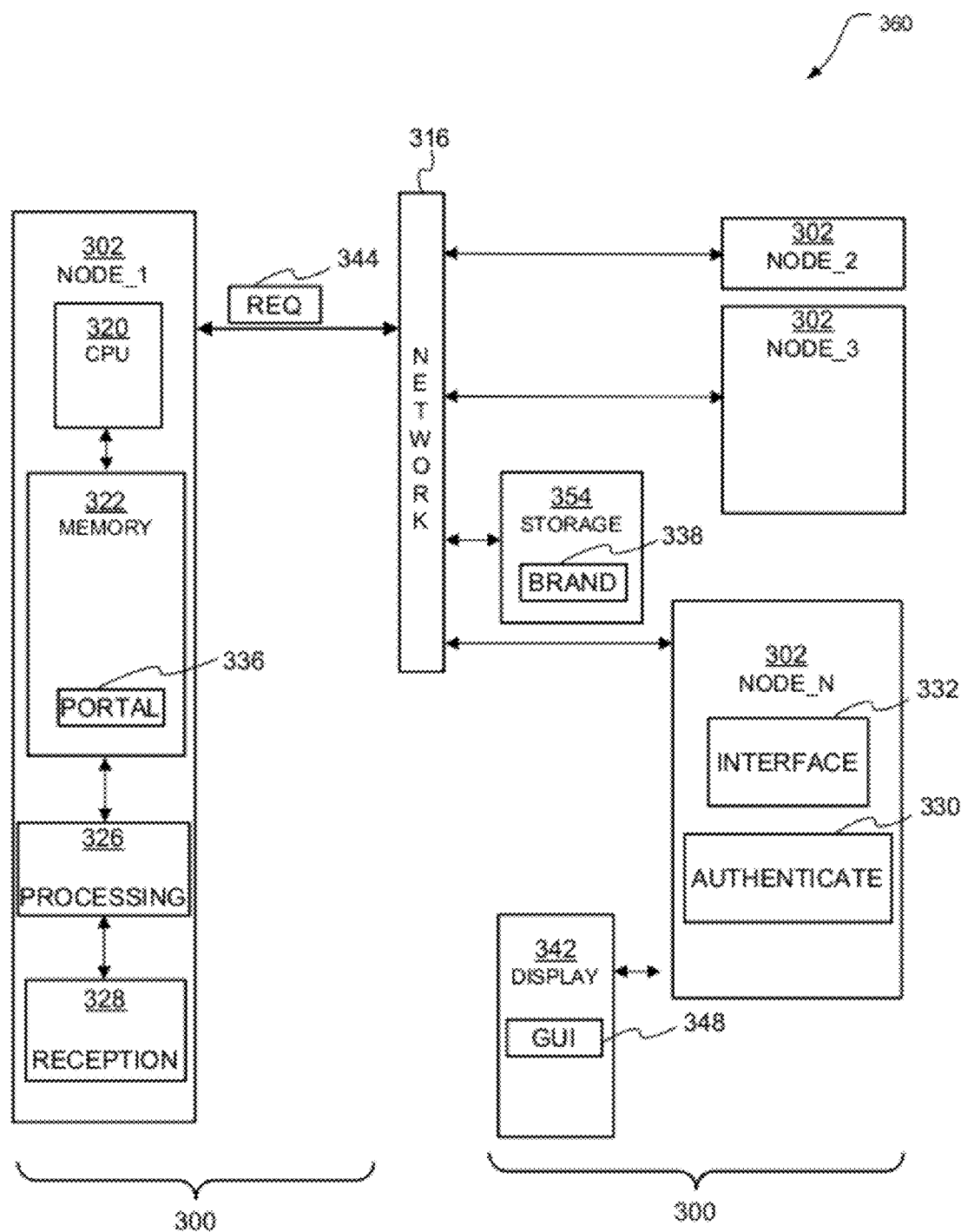
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement portal brand management may comprise one or more processing nodes 302, one or more processors 320, memory 322, a processing module 326, a reception module 328, an authentication module 330, and an interface module 332 (e.g., a network interface).

In some embodiments, the apparatus 300 may comprise one or more displays 342 and/or one or more storage nodes 354. The apparatus 300 may comprise a server, a client, or some other networked processing node.

The processing nodes 302 may comprise physical machines or virtual machines, or a mixture of both. The nodes 302 may also comprise networked entities, such servers and/or clients. In some implementations, the operations described can occur entirely within a single node 302. It should be noted that any one of the nodes 302 may include any one or more of the elements explicitly shown in any other one of the nodes NODE_1, NODE_2, ..., NODE_N.

In some embodiments then, an apparatus 300 may comprise a node (e.g., NODE_1, which may operate as a server that controls access to portal customization) that includes an interface 332 (e.g., a network interface). The apparatus 300 may further comprise a reception module 328 to receive, via the network interface 332 from a node associated with a console owner (e.g., NODE_2), an authenticated access request 344 for access to a network portal 336.

In some embodiments, the apparatus 300 may comprise a processing module 326 to access a branding file 338 (the branding file 338 being associated with the console owner prior to receiving the request 344). Responsive to receiving the request 344, the processing module 326 may operate to generate a branded version of a GUI 348 having at least one background color, a display structure, and a set of uncolored icons, as described previously. The background color(s) and the icons may be selected based on information stored in the branding file 338.

The processing module 326 may further operate to publish the branded version of the GUI 348 to the node (e.g., NODE_2) to grant access to the network portal 336. In some embodiments, the branded version of the GUI 348 may operate to display the uncolored icons in front of the background color(s), so that the background color(s) is/are visible through transparent portions of the transparent, uncolored icons. In some embodiments, the apparatus 300 comprises a display 342 to display the branded version of the GUI 348.

The apparatus may include an authentication module. Thus, the apparatus 300 may comprise an authentication module 330 to authenticate the access request 344.

The apparatus may be coupled to a storage node. Thus, the apparatus 300 may comprise a storage node 354 to store the branding file 338. Still further embodiments may be realized.

For example, it can be seen that a system 360 that operates to implement portal brand management may comprise multiple instances of the apparatus 300. The system 360 might also comprise a cluster of nodes 302, including physical and virtual nodes.

In some embodiments then, a system 360 can operate using one or more nodes 302. That is, a system 360 may comprise a plurality of first nodes (e.g., NODE_1) each including a reception module 328 to receive an authenticated access request 344 for access to a network portal, and a processing module 326 that operates as previously described.

The system 360 may comprise a second node (e.g., NODE_N) associated with the console owner, the second node including an interface 332 (e.g., a network interface) to transmit the access request 344 to the first node, and to receive publication of the branded version of the GUI 348 (e.g., at the display 342 forming part of the second node) to grant access to the network portal 336. The system 360 may comprise a server to host the network portal 336, accessible via the GUI 348.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302, including application information, policy information, resource allocation, and/or the branding collateral stored in the branding file 338.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 211 of FIG. 2. Modules may comprise hardware, software, and firmware, or any combination of these. Additional embodiments may be realized.

Figure 4:
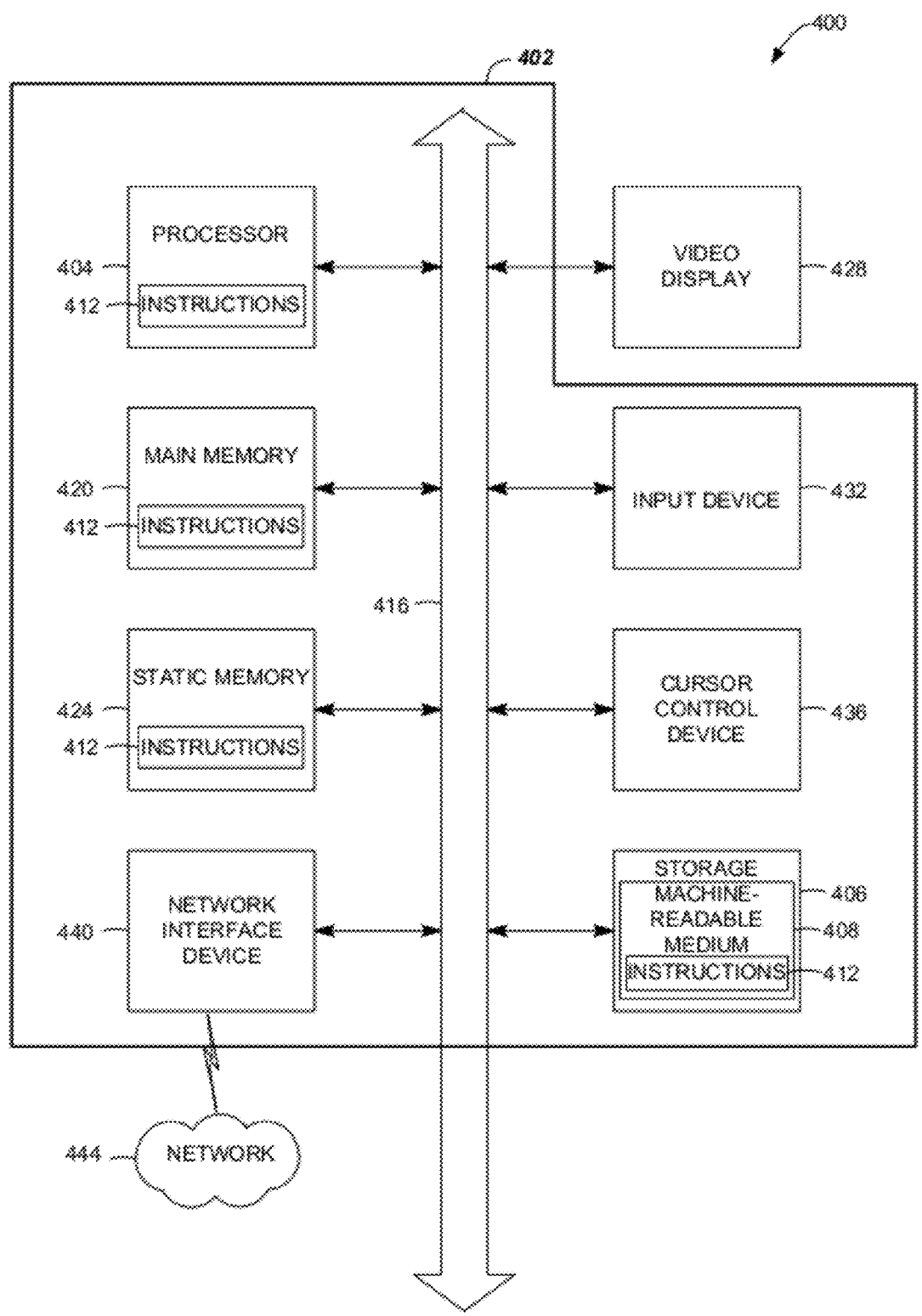
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide a management console that is branded by or for each tenant and/or service/application. The look and feel of the console can be rapidly developed for custom implementation, consistently duplicated, and readily changed. Increased network operational efficiency, and user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a network interface;
a reception module to:
receive, via the network interface from a node associated with a console owner, a selection of a first color for a first branding color scheme and a second color for a second branding color scheme, the first color and the second color associated with a set of permanently unchangeable, uncolored icons with respective transparent portions, an uncolored icon being an object that is rendered as black and white or in gray scale, the first branding color scheme and the second branding color scheme being part of a set of branded versions associated with a branding file for a tenant;
store, in the branding file, components comprising:
the first color and a first plurality of complementary colors for the first branding color scheme, the first plurality of complementary colors being automatically selected based on the first color; and
the second color and a second plurality of complementary colors for the second branding color scheme, the second plurality of complementary colors being automatically selected based on the second color; and
receive, via the network interface, an authenticated access request for access to a network portal from a member identified as a member of a group corresponding to the branding file and the first branding color scheme in the branding file; and
a processing module to:
access the branding file prior to receiving the authenticated access request;
generate, responsive to receiving the authenticated access request, a branded version of a graphical user interface using the first color branding scheme based on the group of the member, the branded version of the graphical user interface having the first color as a background color, the first plurality of complementary colors, a display structure, and the set of uncolored icons; and
publish the branded version of the graphical user interface to the node to grant access to the network portal, the branded version of the graphical user interface to display:
the background color as a background;
the first plurality of complementary colors; and
the uncolored icons in front of the background, so that the background is visible through the transparent portions of the uncolored icons.

2. The apparatus of claim 1, further comprising:
an authentication module to authenticate the access request.

3. The apparatus of claim 1, further comprising:
a storage node to store the branding file.

4. A system, comprising:
a first node including:
a reception module to:
receive a selection of a first color for a first branding color scheme and a second color for a second branding color scheme, the first color and the second color associated with a set of permanently unchangeable, uncolored icons with respective transparent portions, an uncolored icon being an object that is rendered as black and white or in gray scale, the first branding color scheme and the second branding color scheme being part of a set of branded versions associated with a branding file for a tenant;
store, in the branding file, components comprising:
the first color and a first plurality of complementary colors for the first branding color scheme, the first plurality of complementary colors being automatically selected based on the first color; and
the second color and a second plurality of complementary colors for the second branding color scheme, the second plurality of complementary colors being automatically selected based on the second color; and
receive an authenticated access request for access to a network portal from a member identified as a member of a group corresponding to the branding file and the first branding color scheme in the branding file; and
a processing module to:
access the branding file prior to receiving the authenticated access request,
generate, responsive to receiving the authenticated access request, a branded version of a graphical user interface using the first color branding scheme based on the group of the member, the branded version of the graphical user interface having the first color as a background color, the first plurality of complementary colors, a display structure, and the set of uncolored icons; and
publish the branded version of the graphical user interface; and
a second node associated with the console owner, the second node including a network interface to:
transmit the access request to the first node; and
receive publication of the branded version of the graphical user interface to grant access to the network portal, the branded version of the graphical user interface to display:
the background color as a background;
the first plurality of complementary colors; and
the uncolored icons in front of the background, so that the background is visible through transparent portions of the uncolored icons.

5. The system of claim 4, further comprising:
a server to host the network portal.

6. The system of claim 4, wherein the second node comprises:
a display to display the branded version.

7. A processor-implemented method to execute on one or more processors that perform the method, comprising:
receiving a selection of a first color for a first branding color scheme and a second color for a second branding color scheme, the first color and the second color associated with a set of permanently unchangeable, uncolored icons with respective transparent portions, an uncolored icon being an object that is rendered as black and white or in gray scale, the first branding color scheme and the second branding color scheme being part of a set of branded versions associated with a branding file for a tenant;

storing, in the branding file, components comprising:
the first color and a first plurality of complementary colors for the first branding color scheme, the first plurality of complementary colors being automatically selected based on the first color; and
the second color and a second plurality of complementary colors for the second branding color scheme, the second plurality of complementary colors being automatically selected based on the second color;

receiving, from a node an authenticated access request for access to a network portal, hosted by a server, from a member identified as a member of a group corresponding to the branding file and the first branding color scheme in the branding file;

accessing the branding file associated prior to receiving the authenticated access request;

generating, responsive to receiving the authenticated access request, a branded version of a graphical user interface using the first color branding scheme based on the group of the member, the branded version of the graphical user interface having the first color as a background color, the first plurality of complementary colors, a display structure, and the set of uncolored icons; and publishing the branded version of the graphical user interface to the node to grant access to the network portal, the branded version of the graphical user interface to display:
the background color as a background;
the first plurality of complementary colors; and
the uncolored icons in front of the background, so that the background is visible through transparent portions of the uncolored icons.

8. The method of claim 7, wherein the publishing further comprises:
publishing the uncolored icons as permanently unchangeable icons, and publishing at least one icon having no transparent portions that comprises a changeable icon including a trademark associated with the console owner.

9. The method of claim 7, further comprising:
extracting the first color from an image comprising a trademark associated with the console owner.

10. The method of claim 7, further comprising:
monitoring the network portal to detect a modification request to modify the branded version of the graphical user interface; and
denying the modification request when the modification request is not associated with correct modification credentials.

11. A processor-implemented method to execute on one or more processors that perform the method, comprising:

publishing a non-branded version of a graphical user interface to a display to grant access to a network portal;

receiving, from a node associated with a console owner and the display, a customizing request to customize the non-branded version of the graphical user interface;

receiving, from the node, a selection of a first color for a first branding color scheme and a second color for a second branding color scheme, the first color and the second color associated with a set of permanently unchangeable, uncolored icons with respective transparent portions, an uncolored icon being an object that is rendered as black and white or in gray scale, the first branding color scheme and the second branding color scheme being part of a set of branded versions associated with a branding file for a tenant;

storing, in the branding file, components comprising:
the first color and a first plurality of complementary colors for the first branding color scheme, the first plurality of complementary colors being automatically selected based on the first color; and
the second color and a second plurality of complementary colors for the second branding color scheme, the second plurality of complementary colors being automatically selected based on the second color; and publishing a branded version of the graphical user interface to the display to grant access to the network portal, the branded version generated by applying the first branded color scheme, selected based on a identified group of a member using the node, to the non-branded version, including the first color as a background, the first plurality of complementary colors, a display structure, and the set of uncolored icons in front of the background so that the background is visible through transparent portions of the uncolored icons.

12. The method of claim 11, further comprising:
receiving the selection of at least one of the first color or the second color as at least one of a hue and saturation selection or a primary color selection.

13. The method of claim 11, further comprising:
publishing a menu to the display to present options with respect to application of the at least the first color or the second color to display elements in the branded version of the graphical user interface.

14. The method of claim 11, wherein the publishing further comprises:
publishing display elements in the branded version of the graphical user interface to the display, the display elements comprising at least one of a button, a title bar, or a dialog box.

15. The method of claim 11, wherein the branding file comprises at least one cascading style sheet.

16. The method of claim 11, further comprising:
publishing a changeable, colored icon comprising a trademark associated with the console owner as part of the branded version of the graphical user interface.

17. The method of claim 11, wherein the unchangeable, uncolored icons comprise a common, fixed gradient.

* * * * *

UNITED STATES PATENT AND TRADEMARK OFFICE
CERTIFICATE OF CORRECTION

| | | |
|---|---|---|
| PATENT NO. | : 8,898,741 B2 | Page 1 of 1 |
| APPLICATION NO. | : 13/165139 | |
| DATED | : November 25, 2014 | |
| INVENTOR(S) | : Goodwin et al. | |

It is certified that error appears in the above-identified patent and that said Letters Patent is hereby corrected as shown below:

In the Claims,

In column 11, line 62, in Claim 1, delete "background," and insert --background--, therefor In column 12, line 35, in Claim 4, delete "request," and insert --request;--, therefor Signed and Sealed this
Third Day of March, 2015

Michelle K. Lee
*Deputy Director of the United States Patent and Trademark Office*